US011597480B2

(12) United States Patent
Bignonet et al.

(10) Patent No.: US 11,597,480 B2
(45) Date of Patent: Mar. 7, 2023

(54) SYSTEM FOR GUIDING A CONNECTED BOAT EQUIPPED WITH AN ON-BOARD SYSTEM COMMUNICATING WITH A REMOTE SERVER IN ORDER TO MODIFY ITS ROUTE PLAN

(71) Applicant: KARA TECHNOLOGY, Saint Barthelemy d'Anjou (FR)

(72) Inventors: Ivain Bignonet, Saint Barthelemy d'Anjou (FR); Cedric Martin, Murserigne (FR)

(73) Assignee: KARA TECHNOLOGY, Saint Barthelemy d'Anjou (FR)

( * ) Notice: Subject to any disclaimer, the term of this patent is extended or adjusted under 35 U.S.C. 154(b) by 142 days.

(21) Appl. No.: 16/757,029

(22) PCT Filed: Oct. 17, 2018

(86) PCT No.: PCT/EP2018/078451
§ 371 (c)(1),
(2) Date: Apr. 17, 2020

(87) PCT Pub. No.: WO2019/077000
PCT Pub. Date: Apr. 25, 2019

(65) Prior Publication Data
US 2020/0331571 A1 Oct. 22, 2020

(30) Foreign Application Priority Data
Oct. 18, 2017 (FR) ...................................... 1759777

(51) Int. Cl.
G08G 3/00 (2006.01)
B63B 79/40 (2020.01)
(Continued)

(52) U.S. Cl.
CPC .............. B63B 79/40 (2020.01); B63B 49/00 (2013.01); G01C 21/203 (2013.01); B63B 51/00 (2013.01); G08G 3/00 (2013.01)

(58) Field of Classification Search
CPC .................................. B63B 51/00; G08G 3/00
(Continued)

(56) References Cited

U.S. PATENT DOCUMENTS 8,994,556 B2 * 3/2015 Lundy .................... G08B 21/02
340/539.11
9,193,458 B2 * 11/2015 Pongratz ................. B64C 37/02
(Continued)

FOREIGN PATENT DOCUMENTS

CN 203982456 U 12/2014
CN 106355955 B * 12/2018 ............... G08G 3/00
(Continued)

OTHER PUBLICATIONS

Anne Siders et al.,A dynamic ocean management proposal for the Bering Strait region, Marine Policy vol. 74, Dec. 2016, pp. 177-185, from https://doi.org/10.1016/j.marpol.2016.09.028 (Year: 2017).*
Ge, L., Zhang, C., Tian, G. et al. Current Trends and Perspectives of Detection and Location for Buried Non-Metallic Pipelines. Chin. J. Mech. Eng. 34, 97 (2021). https://doi.org/10.1186/s10033-021-00613-z (Year: 2021).*
(Continued)

Primary Examiner — Cuong H Nguyen
(74) Attorney, Agent, or Firm — David D. Brush; Westman, Champlin & Koehler, P.A.

(57) ABSTRACT

A system for guiding a boat, which includes the boat and a remote server. The boat includes a central unit linked to a user interface, a receiver for receiving data transmitted by at least one electronic tag affixed to a device of the boat and to a radio device for bidirectional communication with the remote server. The central unit transmits information result- (Continued)

Figure 1:
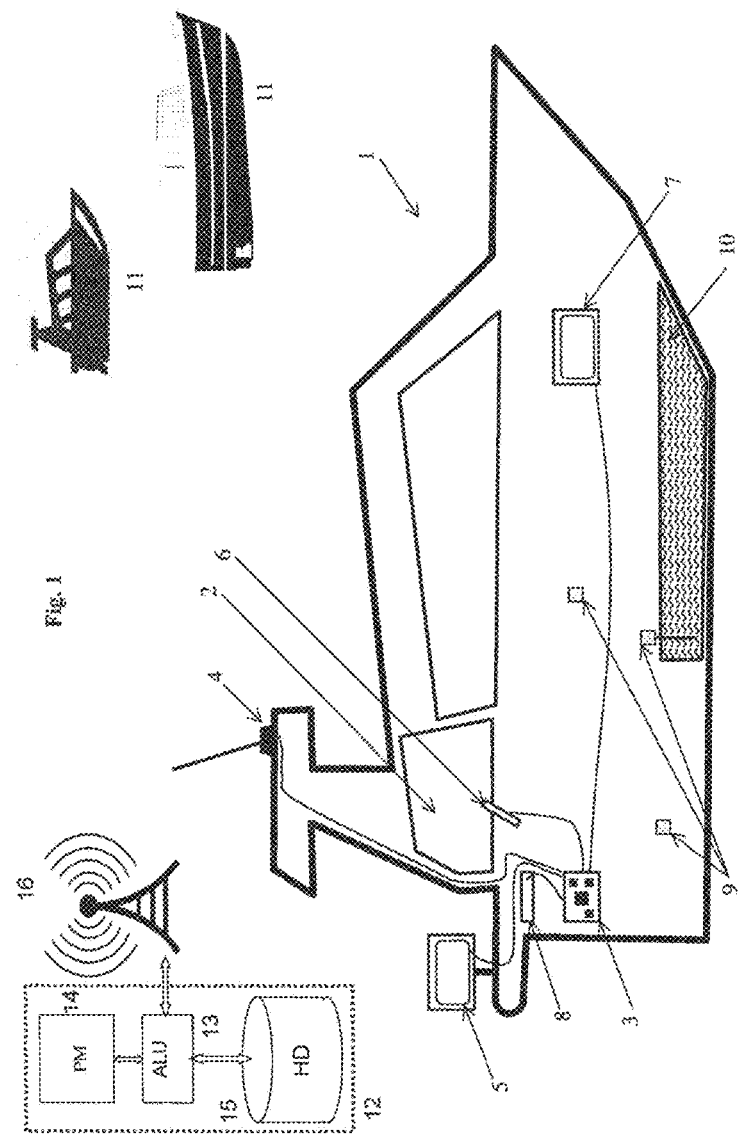

ing from the data transmitted by the tags, the current position and the route plan of the boat via the radio device to the server, and receives route plan modification data, which are displayed on the user interface, from this server. In this way, the operator of the boat is able to gain knowledge of the movement of nearby craft and of possible collision risks. Further, the boat may include on-board connected objects that communicate with the central unit in order to determine whether devices are missing on board.

15 Claims, 4 Drawing Sheets

(51) Int. Cl.
    *B63B 49/00*     (2006.01)
    *G01C 21/20*     (2006.01)
    *B63B 51/00*     (2006.01)

(58) Field of Classification Search
    USPC .......................................... 340/539.13; 701/2
    See application file for complete search history.

(56) References Cited

U.S. PATENT DOCUMENTS

| | | | | |
|---|---|---|---|---|
| 9,381,916 | B1* | 7/2016 | Zhu | G01S 17/931 |
| 9,896,096 | B2* | 2/2018 | Newman | B60W 50/16 |
| 10,302,759 | B1* | 5/2019 | Arteaga | G08G 5/0082 |
| 10,535,023 | B1* | 1/2020 | Kodgers | G06Q 10/06311 |
| 10,650,621 | B1* | 5/2020 | King | H04L 67/10 |
| 2008/0040005 | A1* | 2/2008 | Breed | H01H 35/146 |
| | | | | 701/48 |
| 2013/0200202 | A1* | 8/2013 | Jeddore | B65H 75/22 |
| | | | | 242/597.4 |
| 2015/0232065 | A1* | 8/2015 | Ricci | B60H 1/00742 |
| | | | | 701/36 |
| 2017/0328995 | A1* | 11/2017 | Marschalkowski | G01S 13/878 |
| 2018/0165604 | A1* | 6/2018 | Minkin | G06N 5/022 |
| 2019/0141496 | A1* | 5/2019 | Laster | G06F 3/0484 |
| 2020/0133961 | A1* | 4/2020 | Wroblewski | G06N 3/08 |
| 2022/0198342 | A1* | 6/2022 | Ladoux | B63B 51/00 |

FOREIGN PATENT DOCUMENTS

| | | | | |
|---|---|---|---|---|
| CN | 109427216 | A * | 3/2019 | ............... G08G 3/00 |
| CN | 111681456 | A * | 9/2020 | ............... G08G 3/00 |
| CN | 114372660 | A * | 4/2022 | ............... G08G 3/00 |
| EP | 3006323 | A1 | 4/2016 | |
| FR | 2894704 | A1 * | 6/2007 | ........... G07F 17/246 |
| JP | H06325300 | A | 11/1994 | |
| KR | 20080086216 | A | 9/2008 | |
| WO | 03029837 | A2 | 4/2003 | |
| WO | 2004019301 | A1 | 3/2004 | |
| WO | WO-2007066020 | A2 * | 6/2007 | ........... G07F 17/246 |

OTHER PUBLICATIONS

Development, Demonstration and Dissemination of Integrated Technology Solutions to Improve Hazardous Materials Transportation Safety and Security; M Abkowitz, C Philip, I Dash—2020—phmsa.dot.gov (Year: 2020).*
Wrist-based Phonocardiogram Diagnosis Leveraging Machine Learning; Abdelmageed, Shaima (Apr. 17, 2019); from http://urn.fi/URN:ISBN:978-952-476-851-1 (Year: 2019).*
S. G. Li, X. Han and Z. Z. Gao, "Inland river ship supervision system based on ZigBee and RFID technology," 2013 IEEE International Conference on Applied Superconductivity and Electromagnetic Devices, 2013, pp. 185-188, doi: 10.1109/ASEMD.2013.6780740 (Year: 2013).*
Guofang Kuang et al., The application of management Information System in Internet of Things based on RFID Technology, Sensors & Transducers, vol. 154, Issue 7, Jul. 2013, pp. 103-112 (http://www.sensorsportal.com). (Year: 2013).*
B. Brandherm and A. Kroner, "Digital Product Memories and Product Life Cycle," 2011 Seventh International Conference on Intelligent Environments, 2011, pp. 374-377, doi: 10.1109/IE.2011.76. (Year: 2011).*
W. He, E. L. Tan, E. W. Lee and T. Y. Li, "A solution for integrated track and trace in supply chain based on RFID & GPS," 2009 IEEE Conference on Emerging Technologies & Factory Automation, 2009, pp. 1-6, doi: 10.1109/ETFA.2009.5347146. (Year: 2009).*
Sam Liu "Extended memory RFID tages provide immediate access to data anywhere, anytime", from Sensors/Control; 2007 OpenSystems Publishing. (Year: 2007).*
The Use of Electronic Tags in Fish Research—An Overview of Fish Telemetry Methods by Eva B. Thorstad et al.;Turkish Journal of Fisheries and Aquatic Sciences, 2013, vol. 13, No. 5 (pp. 881-896) (Year: 2013).*
"Extended memory RFID tags provide immediate access" by Sam Liu; OpenSystems Publishing (Year:2007).*
A solution for Integrated Track and Trace in Supply Chain based on RFID & GPS by W. He et al. (downloaded.*
Report of the National Marine Fisheries Service Workshop on Advancing Electronic Tag Technologies and Their Use in Stock Assessments, Aug. 23-25, 2005; NOAA Technical Memorandum NMFS-F/SPO-82 (Year: 2005).*
International Search Report dated Dec. 7, 2018 for corresponding International Application No. PCT/EP2018/078451, filed Oct. 17, 2018.
Written Opinion of the International Searching Authority dated Dec. 7, 2018 for corresponding International Application No. PCT/EP2018/078451, filed Oct. 17, 2018.
English translation of the Written Opinion of the International Searching Authority dated Feb. 1, 2019 for corresponding International Application No. PCT/EP2018/078451, filed Oct. 17, 2018.
French Search Report dated Jun. 7, 2018 for corresponding French Application No. 1759777, filed Oct. 18, 2017.

* cited by examiner

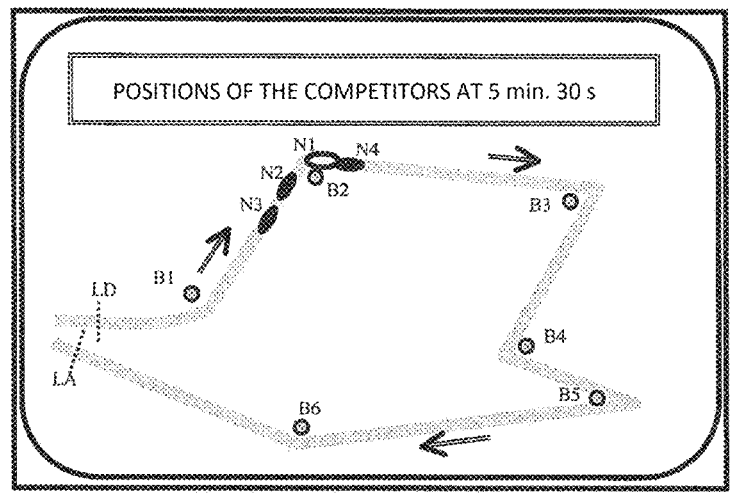

SYSTEM FOR GUIDING A CONNECTED BOAT EQUIPPED WITH AN ON-BOARD SYSTEM COMMUNICATING WITH A REMOTE SERVER IN ORDER TO MODIFY ITS ROUTE PLAN

CROSS-REFERENCE TO RELATED APPLICATIONS

This Application is a Section 371 National Stage Application of International Application No. PCT/EP2018/078451, filed Oct. 17, 2018, which is incorporated by reference in its entirety and published as WO 2019/077000 A1 on Apr. 25, 2019, not in English.

1. FIELD OF THE INVENTION

The field of the invention is that of a craft comprising an on-board system communicating bidirectionally with ground stations or with other boats in order to transmit its geographical position. The invention more specifically relates to the fact that the route plan of the boat is modified following a communication in order to respond to a specific service for said boat.

2. TECHNOLOGICAL BACKGROUND

Nowadays, an increasingly substantial public indulges in the pleasure of recreational boating. Said activity procures a great pleasure and a strong feeling of freedom when the boat moves on the sea. But said leisure activity must remain safe and the occupants of a boat must not only learn to use same, but also know the environment of the sea to move there in complete safety. To avoid accidents, the boat is equipped with a number of devices, and first and foremost a radio communication means. Thanks to the radio, the skipper may communicate vocally with ground stations in order to know the weather forecasts (whereof the development of the wind and of the sea), the availability of a port, the possibility of refuelling. The skipper also has charts and/or a GPS system on board for finding his position. By knowing his position and by defining his point of arrival, the skipper traces a route plan that notably makes it possible to avoid obstacles, reefs for example.

The radio also makes it possible to launch distress calls to craft close by so that same come to your rescue. The skipper of the boat describes the criticality of its situation and communicates its position. The other craft may then divert in order to provide assistance to said boat. The radio also makes it possible for a skipper of a boat to warn the other craft of the presence of an obstacle at a certain place, an iceberg for example, and optionally indicate its movement.

In other less critical circumstances, the radio makes it possible to anticipate a need that will start to become apparent and risks compromising the continuation of the journey if it is not resolved. For example, the boat has a drinking water reserve that it is necessary to fill regularly, at risk of affecting the comfort of the passengers. Similarly, the refuelling must be provided by taking into account the route time to the next port. In the case of a motorboat, the tank must not become empty while the vessel is out at sea. All of said needs may be anticipated by radio communications in order to check that the products necessary for the continuation of the journey are indeed located on board.

If the boat is rented, the last person to take same must indicate to the renter its state and notably if important elements are missing (for example a life jacket). By indicating by radio that certain devices are missing or out of service, the renter may search for said elements so as to put same on the boat when said latter has returned to the port, and thus to make said boat more quickly operational for the next rental.

The boats may also be used during a race, in this case they are equipped with location beacons that permanently transmit signals to a ground server that may thus determine in real time the positions of competitors and determine who is in the lead.

Document JP-WO2004/019301 filed by ISHIKAWA HARIMA discloses the guiding of a craft according to a certain route plan, using mobile phones that communicate in real time the position of the craft to a ground server. The server transmits navigation orders to be performed in order to reach a certain position (the pier for example). Each craft may also communicate with the server that knows their respective positions and signals any collisions.

Document JP H06 325300 filed by TOKIMEC discloses a system for helping the craft to navigate in difficult atmospheric conditions, for example in fog, and to prevent collisions. The craft 20 communicate with satellites and a ground system and receive information to be displayed on a screen, whereof the trajectory of the boats that are close.

Document KR 2008/0086216 filed by RF TECKWIN describes a device for communication between on-board systems in craft and ground servers. The on-board system identifies the craft with a port authority and use in case of emergency, and transmits a distress signal in case of emergency.

All of said examples show the important role of the radio, but the communications are sometimes tedious for the skipper who must both concentrate on the navigation and hold a conversation.

All of said examples show the need to invent a new concept of management of the navigation for a boat that communicates automatically with the devices close by and advises its skipper on the action to take, by optionally proposing a new route plan.

3. DESCRIPTION OF THE INVENTION

In one particular embodiment of the invention, a system for guiding at least one boat is proposed comprising said boat and at least one remote server, said boat including a central unit linked to a user interface, a means for receiving data transmitted by at least one electronic tag affixed to a device of the boat and to a radio means for bidirectional communication with the remote server, characterized in that said central unit transmits information resulting from the data transmitted by the tags, the current position and the route plan of the boat, via radio to the server, and receives from said server route plan modification data, which are displayed on the user interface.

In this way, the skipper of the boat may gain knowledge of the movement of nearby craft and of possible collision risks, and receive a new route plan if necessary.

According to one first embodiment, the radio means for bidirectional communication is designed for receiving the position of at least one other craft that navigates according to the same route plan, and has left at the same moment to leave from a different starting point, the user interface displaying the position of the boat and of the at least one other craft.

According to another embodiment, the method for guiding a boat includes a means for establishing a radio communication with electronic tags (9) affixed to objects on board the boat, said means receives from said tag a code identifying the object, and the central unit compares the identifiers received with a list of identifiers in memory in order to list and display on a screen the objects present and absent on board.

In one particular embodiment of the invention, it is proposed a method for guiding at least one boat including a central unit linked to a user interface, a means for receiving data transmitted by at least one electronic tag affixed to a device of the boat and to a radio means for bidirectional communication with a remote server. The method includes the steps of:
- transmitting by said central unit to a remote server information resulting from the data transmitted by the state data tags of the boat (1), the position of the boat and the route plan of the boat,
- transmitting by said server route plan modification data, which are displayed on the user interface (5, 7).

According to a first embodiment, the method for guiding a boat further includes the steps of:
- transmitting by at least one other craft to the central unit its route plan and its position,
- calculating the trajectory of the at least one other craft as a function of time, defined by the route plan transmitted,
- comparing by the remote server the trajectory of the boat defined by its route plan and the at least one trajectory of the at least one other craft,
- determining the distances separating the positions of the boat and the at least one craft at regular time intervals according to their respective trajectories and detecting a collision risk if said distance is located below a certain value at a certain moment.
- displaying a collision risk by indicating the place where said collision will occur.

According to another embodiment, said central unit transmits to a management server of a port its route plan for arriving at said port, and the method further includes the steps of:
- determining by the server of the port a space available for the mooring of said boat in said port,
- modifying by the server of the port the route plan transmitted in order to reach the available space,
- transmitting by the server to the boat a modified route plan and displaying the modified route plan on a screen of the boat.

According to another embodiment, the method for guiding a boat further includes the steps of:
- receiving by the boat and at least one other craft the same route plan from different starting points,
- starting from each starting point of the boat and of the at least one other craft in order to navigate according to the trajectory defined by the same route plan,
- transmitting by the at least one other craft its position to destination of the boat,
- receiving the position of the at least one other craft and displaying on a screen the position of the boat and of the other at least one other craft According to another embodiment, the method for guiding a boat further includes a step of calculating the classifications of the boat and of the at least one other craft depending on their respective positions on the route plan, and a step of displaying an indication on the classification of the boat and of the at least one other craft.

According to another embodiment, the method for guiding a boat further includes a step of introducing a command to signal the presence of a floating object in the vicinity of the boat, said introduction step triggering a step of transmitting by radio a message associating the presence of a floating object at the position of the boat at the time of the introduction of the command.

According to another embodiment, the method for guiding a boat further includes a step of establishing a radio communication with electronic tags affixed to objects on board the boat, said tags transmitting a code identifying the object, and a step of comparing identifiers received with a list of identifiers in order to list and display on a screen the objects present and absent on board.

According to another embodiment, the electronic tag is affixed to a water tank and transmits information representative of the water level inside, the method including a step of comparing the current water level with a minimum water level, said step triggering if the level is below the minimum level a step of determining a new route plan enabling the boat to arrive at a water reserve and a step of displaying said new route plan.

According to another embodiment, the electronic tag is affixed to a fuel tank and transmits information representative of the fuel level inside, the method including a step of comparing the current fuel level with a minimum fuel level, said step triggering if the level is below the minimum level a step of determining a new route plan enabling the boat to arrive at a fuel reserve and a step of displaying said new route plan.

According to another embodiment, the electronic tag is affixed to a device whereof the failure is detectable by said tag, the method including a step of detecting the failure of said device triggering the steps of:
- transmitting by the central unit to a ground server the position of the boat, the route plan and the reference of the faulty device,
- searching by the server for a port where a device in working order is available, the port being selected according to its proximity with the point of arrival of the boat,
- transmitting by the server to the boat a new route plan enabling the boat to arrive at the port selected,
- displaying on a screen the new route plan.

According to another embodiment, the method for guiding a boat includes a step of introducing a command to reserve the device present at the port triggering a step of transmitting to the server a signal for reserving said device.

According to another embodiment, the boat includes an impact detector intended to detect impacts against the hull, said method including the transmission to a ground server of a signal when an impact is detected and the display on a screen of the server of the presence of said impact.

4. LIST OF FIGURES

Figure 2:
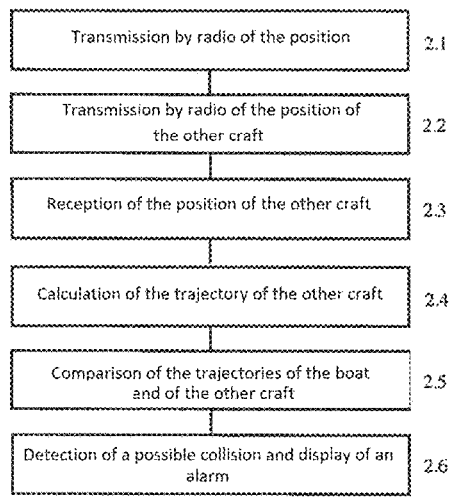
Figure 3:
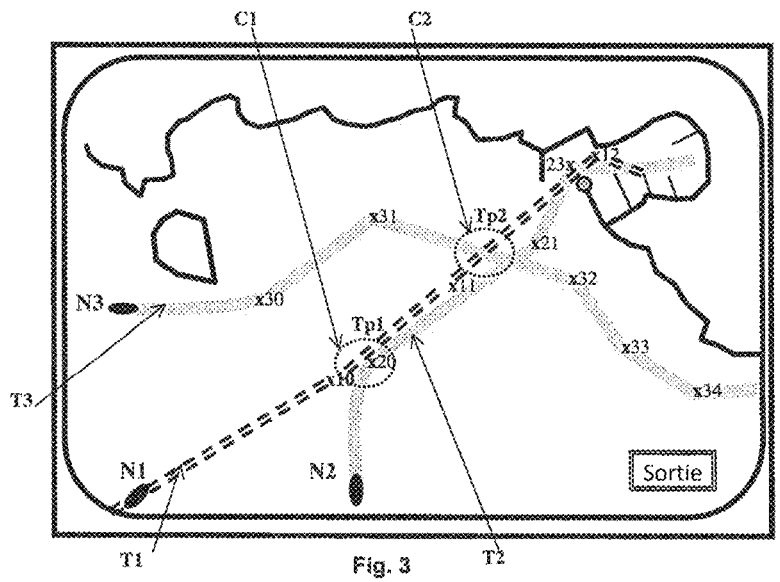
Figures 6, 7:
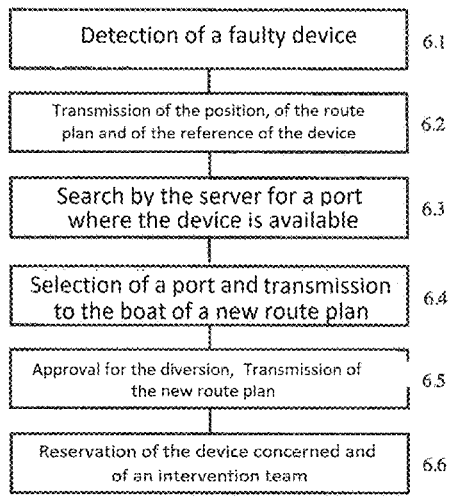

Other features and advantages of the invention will become apparent upon reading the following description, given by way of non-limiting example, and the appended drawings, wherein:

FIG. 1 presents an example of diagram of a connected boat that can be used within the scope of the present invention, FIG. 2 shows an example of steps enabling the on-board system to warn the collisions with other boats, FIG. 3 represents an example of screen page displayed on a screen of the boat for showing the collision risks, FIG. 4 represents an example of screen page in the context of a virtual race between a plurality of craft, FIG. 5 represents an example of menu displayed on a screen of the boat listing the devices present on board and giving indications on their states, FIG. 6 shows an example of steps for detecting a failure on an device on board and changing said device, FIG. 7 represents an example of menu displayed on a terminal screen of a ground server listing the devices present on board and giving an indication on impacts suffered to the hull.

5. DETAILED DESCRIPTION

On all of the figures of the present document, the identical elements are designated by a same numerical reference.

5.1 General Description of the Invention

In one particular embodiment of the invention, it is proposed a system for guiding a boat comprising said boat and a remote server. The boat includes a central unit linked to a user interface, a means for receiving data transmitted by at least one electronic tag affixed to a device of the boat and to a radio means for bidirectional communication with the remote server. The central unit transmits information resulting from the data transmitted by the tags, the current position and the route plan of the boat, via radio to the server, and receives from said server route plan modification data, which are displayed on the user interface.

It is also proposed a boat including a central unit linked to a user interface and to radio means of bidirectional communication. The central unit transmits by radio to a receiver status data of the craft and notably its position, and receives from said receiver information to be displayed on the user interface, said information relating to the navigation of the boat. In this way, the skipper of the boat may gain knowledge of the movement of nearby craft and optionally of the collision risks.

5.2 Material Description of a Connected Boat

FIG. 1 presents an example of diagram of a connected boat that can be used within the scope of the present invention and communicating with other craft and ground radio stations. The boat 1 is, for example, a motorized pleasure boat, which in no way excludes operating with sails, or with solar energy. The boat has a space 2 for its skipper. Said space is generally located towards the front and at height for a motorboat, or rather at the rear for a sailing boat. The boat 1 is said to be "connected" in that it includes an on-board computer system comprising a control unit 3 including in a manner known per se: a central unit, a memory and input and output ports. The unit is permanently powered by a battery that is generally recharged by solar panels. The control unit 3 possesses software means for downloading applications and thus enhancing its processing capacities. The control unit notably has a means for determining its geographical position, a "Global Positioning System" (GPS) for example. The control unit is linked to various on-board devices that will be described in detail, the assembly constituting the on-board system.

The on-board system includes a radio communication means 4 for communicating with ground intervention centres and craft that are located in the vicinity. Said means is generally a VHF ("Very High Frequency") radio appliance, or a long-distance radio communication module, or even a cellular telephone module (GSM for example) that can be used close to coasts. Said means may be the same as that for verbal dialoguing with a remote interlocutor.

The on-board system also includes at least one user interface preferably present in the form of a touch table 5 placed at the rear of the space 2 where the skipper of the boat is located. Advantageously, the table is inclinable according to an angle of at least 100° and is placed at the top of a stand securely attached to the boat. According to one alterative, the user interface consists of a screen and a separate keyboard 6 placed in the immediate vicinity of the rudder, or even of a screen associated with a voice recognition means. Other screens 7 may be located in cabins inside the boat, said screens make it possible for passengers immediately inside to navigate the boat 1.

According to one particular embodiment, the on-board system includes a means 8 for detecting and communicating with radio tags 9 that are located in the boat. Said means is, for example, a detector of RF_ID chips that uses "Near Field Communication" (NFC) radio waves by transmitting a high-frequency electromagnetic field. Said electric field is sensed by a coil printed on the tag and a voltage is generated to its terminals in order to supply with energy an RF_ID type electronic chip, for example. In its basic version, the electronic chip includes a memory containing a computer code. The chip thus supplied reads the code in its memory and transmits same in response to the appearance of the electromagnetic field. The data of the code are transmitted in series by generating a return wave that is superimposed with the electromagnetic field and that may be sensed by the antenna of the detection means 8. Said code is very generally specific to the device whereon a radio tag is affixed, so that the code produces at least the identification function of said device.

The control unit 3 triggers the activation of the electromagnetic field transmitted by the detection means 8, and the listening of the signals transmitted by all of the tags present within a radius of a few metres inside the boat 1. The control unit 3 thus receives the identification codes of the devices present in the boat 1 and associated with the tags thus activated. In this way, the on-board system may detect on board their presence or their absence. Some devices are associated with values that characterize their current operating states, for example a tank of drinking water 10 can be cited having a level gauge and an associated sensor that communicates with the control unit by radio or by a wired connection. The value representative of the water level is transmitted to the control unit 3 that may thus determine the presence of one or more water tanks 10 on board and the quantity of water that they contain.

The control unit 3 exchanges data through its radio communication means 4 with other craft 11 that are located in the vicinity and/or with ground intervention centres 12, preferably located on the coast. Said intervention centres 12 comprise servers conventionally having a central unit 13, a program memory 14 and a data memory 15, they are connected to one or more fixed antennas 16 for the radio communication. The data exchanged are typically information transmitted by at least one tag affixed to an on-board device, the position of the craft and the route plan such as defined for example by the skipper. Said data are regularly transmitted by the on-board system without intervention of the skipper.

After presenting the various elements of the on-board computer system, we will now describe in detail how same engage and show the operation of said system. The engagement between said elements is performed according to a plurality of scenarios that will now be described.

5.2 Prevention of Collisions

According to a first scenario, the boat 1 transmits by radio its route plan around itself and receives the route plans of the other vessels navigating close to it. A route plan is a succession of geographic points that are introduced by the skipper and that define a succession of straight lines forming the trajectory of the craft from its current position. A route plan is as a result a succession of points forming a broken line starting from a given geographic point. A trajectory is a set of pairs formed by geographic points determined by a route plan and moments where the craft reaches each point given its current speed. The on-board system displays on a screen the current position of the boat 1 and its own trajectory as well as same of the other vessels, and an alarm sounds and/or is displayed so as to warn of a possible collision.

The main steps of said scenario are described by the flowchart in FIG. 2, said flowchart representing the main steps of a program that can be executed by the unit 3 of the boat 1. Firstly, at step 2.1, the boat 1 uses its radio communication means 4 to transmit a message indicating its position, its route plan and the forecast speed to travel said route plan. The message is received by a plurality of craft (step 2.2) and each one determines the trajectory of the boat 1 as a function of time. At step 2.3, each craft transmits to the boat 1 a message including its own position, its own route plan and its forecast speed. The boat 1 receives said latter message, calculates the trajectories of the other craft as a function of time and displays on a screen its own trajectory as well as same of the other boats.

An example of screen page displayed on the screen 5 is presented in FIG. 3 where it can be seen that the boat 1 travels a trajectory T1, a craft N2 travels a trajectory T2, and a craft N3 travels a trajectory T3 (step 2.4). For each craft Nj, the trajectories are modelled by a set of geographic coordinates Nj(xi,yi) associated with a succession of given instants Tpi, each coordinate being separate by a certain duration, 10 seconds for example.

At step 2.5, the unit 3 of the boat compares the coordinates N1(xi,yi) of its own trajectory T1 with the coordinates N2(xi,yi) of the other trajectories at the same instant, and calculates the distances between the boat 1 and the other craft at the same instant. If at a certain moment a vessel will be located at less than a certain distance from the boat 1 (typically 50 metres), then the unit 3 detects a collision risk. In this case, the collision risk is displayed on the screen in the form of an alarm icon showing the place of the possible collision, (step 2.6). An indication may also be displayed to indicate at what moment said collision may intervene. Said alarm then warns the skipper who will be strongly advised to modify his route plan. On the example of menu in FIG. 3, two collision risks have been determined by the unit 3, one with the craft N2 at the moment Tp1, and the other with the craft N3 at the moment Tp2. Advantageously, the place where the collision risk is located is highlighted graphically (it is marked by a circle in dotted line in FIG. 3), by a flashing, or a highlighting, and optionally signalled by an audible signal.

According to one improvement, the on-board system regularly transmits to other craft and/or to a remote server 12 its position, its route plan and the forecast speed to travel said route plan. Subsequently receiving the messages from craft close by, the on-board system updates the presentation of the trajectories as illustrated in FIG. 3. Thus, the skipper can see the development of the trajectories, and the collision risks. Said improvement is particularly suitable for sail boats whereof the movement speeds may fluctuate considerably.

According to another improvement, the craft is in motion towards a port and the route plan is transmitted to a ground intervention centre 9 that manages the available spaces. The ground server determines a free space for said boat and during the navigation, transmits thereto a new route plan whereof the point of arrival is the exact position of said space. The boat displays on a screen the position of said space and a message of the type:

"the server of the port proposes coming to berth at said place"

"Do you want to modify the route plan to go there?"

If at said question the skipper answers by the affirmative, the on-board system modifies the route plan so that the last positions make it possible for the boat to reach said space.

5.4 Description of a Boat Connected to Other Boats

According to a second scenario, the boat 1 takes part in a virtual race with other boats, which must complete the same route plan, starting at the same moment but not at the same place. To make it possible to identify the route, buoys are installed at points Routes are marked by buoys over the stretch of water and start and finish buoys are defined. The boats communicate with one another to exchange their relative positions in relation to their starting points and, by comparing with its own position, the on-board system determines its classification within said race.

To complete said virtual race, the boats communicate with one another either directly, or by passing through servers and computer networks. In this way, very large distances may separate the boats, thus preventing any collision risk. Before the start, each craft has received the same route plan optionally marked by the buoys, and starts its race from a different starting point. At the same moment, all of the craft receive the signal of the start. During the navigation, each boat transmits its position in relation to the common route plan, for example a craft may transmit the fact that it has passed the third geographic point of 250 metres and that it is located at 330 metres from the geographic point of the fourth geographic point. If the boat 1, receiving said message determines that it is located at 100 metres from third geographic point and at 480 metres from the fourth geographic point, then it is behind.

An example of screen page in the context of a virtual race is presented in FIG. 4. Four boats can be seen navigating on the same route plan, with their respective positions at a given instant that is displayed. The journey includes 6 buoys, a start line LD and a finish line LA. It can be clearly seen that the craft N4 is ahead and followed very closely by the boat NI, then comes the craft N2 and finally the craft N3 in fourth position. The fact that the craft N4 and NI are very close on the screen in no way affects their safety since they are physically located very far away from one another.

5.5 Signalling of a Floating Object

According to a third scenario, during the navigation, the skipper of the boat 1 detects an object close by, said object must be signalled because it may obstruct the navigation of other craft, this is typically the case of an iceberg or of the entire floating mass whereof the trajectory is not controlled. The skipper of the boat develops a message signalling said object, and the on-board system associates said information with the geographical position of the current position of the boat and transmits the message by radio. Advantageously, the message also comprises an indication on the nature of the object (iceberg, tree stump, metal container, etc.) and optionally its dimensions and the probable direction of its movement determined by the sea current at said place.

5.6 Description of a Boat Communicating with Connected Objects

According to a fourth scenario, the boat 1 has a means 8 for detecting and communicating with radio tags 9 that are located on board. In this way, the on-board system may control the presence or absence of connected objects to which the tags are affixed. Said objects are for example:

a certain number of life vests, harnesses
a life raft, a first-aid kit,
a drinking water reserve,
a complete set of nautical charts,
the logbook,
marker beacons for locating incidents,
etc.

All of said devices possess RF_ID tags for detecting their presence. According to one improvement, three types of tags exist depending on the type of information written in the memory of the chip. The first type possesses a code definitively written by the manufacturer of the chip, said code identifying a device. Said first type of tag is affixed to devices that do not require maintenance, as is the case for example for the life vests, the harnesses (case of a sailing boat), the life raft. The second type of RF_ID tags possesses a code that can be written after its affixing on a device. Said second type of chip is attached on devices whereof the use state depends on a parameter the value of which is unknown during the manufacture of the chip and that is written when the chip is affixed to the device. Said value is for example an expiry date, or the region described by a nautical chart. This is the case for example for distress flares, or food. The third type of chip comprises a memory that can be rewritten many times, typically an EEPROM (Electrically Erasable Programmable Read Only Memory). Aside from the fact that the value written in the chip identifies the device, said value is characteristic of its operational state or of a variable parameter related to the use of the device. Said value is for example the water level in the drinking water tank, or the voltage of the battery in the marker beacon for locating incidents.

By receiving the data transmitted by the various tags, the on-board system produces a control according to their types. In the case of the first type, the on-board system only controls the presence of the object and may thus display on the screen for example the number of life jackets, the presence of the life raft, and of the first-aid kit. Concerning the devices having a tag of the second type, the on-board system controls their presence but if they are usable. For example, distress flares have a validity period of a few years at most and the expiry date is written in the memory of the chip. Another example relates to the nautical charts, the code written in the chip identifies notably the region described by the map and the on-board system checks that among the maps present on board at least one exists relating to the position where the boat is located. If after the control, the on-board system detects an anomaly, then its signals same in a menu.

The devices having tags of the third type have at least one parameter varying over time. When the on-board system activates the detection means 8, the tags of the third type are activated, measure the value of the parameter and transmit same in the message. The on-board system then controls their presence as well as the value of the parameter, and displays said information in a menu.

FIG. 5 represents an example of menu displayed on the screen 5 listing the equipment present on board and giving for some of them information on their states. Thus, it can be noted that the distress flares are indeed present on board but are expired, that the water level in the tanks is at half of the capacity and that it is necessary to change the battery of one of the marker beacons.

According to one improvement, when a device is missing on board and that its absence or its state is critical, then the on-board system launches a message to a ground server 12. Said message includes the current position, the route plan and the reference of the missing or non-operational device. The ground server 12 receives the reference of the equipment and launches an order in view of finding ports where said device is available. After a certain search time, the ground server analyses the responses and chooses the one for which the available device is located the closest to the point of arrival of the boat 1. The ground server modifies if necessary the route plan in order to divert the boat to the port where the device is available. The new route plan is displayed to the skipper who may then decide if he wants to divert or not.

According to another improvement, the element that risks lacking is the fuel. The on-board system detects that the fuel level is below a certain threshold, the ground server 12 transmitting in route plan towards a port provided with a fuel pump where the boat craft can refuel.

According to another improvement, the element that risks lacking is the drinking water. The on-board system detects that the drinking water level in the tanks is below a certain threshold, the ground server 12 checks if the route plan guides the boat towards a port where the drinking water is available, and if this is not the case, the server then transmits a new route plan for a port provided with a drinking water tanker or tap.

According to another improvement, the element is an important mechanical component of the boat such as a pump, an engine or a battery, said element is provided with a tag capable of transmitting information on its operational state. In this case, the on-board system and the ground server 12 establish a scenario for proposing to the skipper an intervention. The main steps of said scenario are described by the flowchart in FIG. 6, said flowchart representing the main steps of a program that can be executed by the unit 3 of the boat 1.

At step 6.1, the on-board system detects a failure on an device on board. The control unit 3 develops a message containing the position of the boat, the route plan and the reference of the faulty device and transmits same by radio (step 6.2). The ground server 12 that receives the message performs a search and selects a port depending on the point of arrival of the boat 1 defined by the route plan (step 6.3), a spare part being available at said port. At step 6.4, the ground server transmits to the boat said information in a message whereof the content is displayed. The skipper of the craft may then decide or not to divert the boat to said port and follow the new route plan proposed by its on-board system (step 6.5). Advantageously, at step 6.6, the on-board system transmits a message indicating the new route plan and signalling to reserve said spare part. The ground server 12 then reserves said part and optionally the services of an intervention team to change same.

5.6 Description of a Connected Boat

According to a fourth scenario, the boat is intended for rental and possesses a means 8 for detecting and communicating with radio tags 9 that are located on board. In this way, the on-board system may control the presence or absence of connected objects to which the tags are affixed. Said objects are those for example listed in Section 5.5.

During the rental, the on-board system detects at various moments the presence of tags on board and objects to which they are affixed. During regular time intervals, every quarter of an hour for example, the boat transmits a message describing the list of devices on board with optionally information on their operational states. At the end of the rental, the renter is thus informed that the boat has all of its devices or if devices are missing. If devices are missing, the renter may anticipate the return of the boat and bring on the pier the missing devices. In this way, the boat is rendered operational more rapidly for the next rental.

According to one improvement, the boat has at least one impact detector capable of detecting if the boat has hit a solid object, a reef for example. Said impact detector is connected to the control unit 3 and immediately transmits its information during an impact. The control unit 3 then transmits a message containing the position of the boat, the route plan and information describing the nature of the impact (amplitude, repeatability, location on the hull, etc.). At the end of the rental, the renter is warned that the boat 1 has suffered an impact, and will be encouraged to perform a complete inspection of the hull. According to said inspection, the renter will decide if the boat may be re-rented or not.

FIG. 7 represents an example of menu displayed on a terminal of the ground server and listing the devices present on board of the boat, as well as the presence of any impacts against the hull. In a window, the on-board system has detected the presence of two impacts during the rental. For each of said impacts, the screen displays the time and the amplitude measured by the impact detector, as well as the localization that may be performed using a plurality of sensors two at the front of each side of the hull, and two at the rear also of each side.

Although the present invention has been described with reference to the particular embodiments illustrated, it is not limited by these embodiments, but only by the appended claims. It will be noted that changes or modifications may be made by the person skilled in the art.

The invention claimed is:

1. A system for guiding at least one boat comprising:
a remote server; and
said boat, wherein said boat comprises:
at least one device having a parameter varying over time;
a user interface;
at least one electronic tag affixed to the at least one device of the boat, the at least one electronic tag comprising a chip comprising a memory that can be rewritten;
a data receiver, which is configured to receive data transmitted by the at least one electronic tag;
a radio device, which is configured to communicate bidirectionally with the remote server; and
a central unit linked to the user interface, the data receiver and the radio device, wherein said central unit is configured to:
transmit information to the remote server via the radio device resulting from:
the data transmitted by the at least one electronic tag, the data transmitted by the at least one electronic tag comprising a value of the parameter varying over time;
a current position of the boat; and
a route plan of the boat; and
receive from said remote server route plan modification data, which are displayed on the user interface.

2. The system according to claim 1, wherein the radio device is configured to receive a position of at least one other craft that navigates according to the same route plan, and has left at a same moment from a different starting point, the user interface displaying the position of the boat and of the at least one other craft.

3. The system according to claim 1, wherein:
the data received by the data receiver comprises a code identifying the at least one device of the boat, the central unit being further configured to compare the code received with a list of identifiers in memory in order to list and display on the user interface devices present and absent on board.

4. A method for guiding at least one boat including:
at least one device having a parameter varying over time; and
a central unit linked to a user interface, a data receiver for receiving data transmitted by at least one electronic tag affixed to the at least one device of the boat, and a radio device for bidirectional communication with a remote server, wherein the electronic tag comprises a chip comprising a memory that can be rewritten, and the data transmitted by the at least one electronic tag comprises a value of the parameter varying over time,
wherein the method comprises:
transmitting by said central unit through the radio device to a remote server information resulting from the data transmitted by the at least one electronic tag of the boat, a position of the boat and a route plan of the boat; and
receiving by said central unit through the radio device route plan modification data from the server, and displaying the route plan modification data on the user interface.

5. The method for guiding a boat according to claim 4, wherein the method further comprises:
calculating by the remote server a trajectory of at least one other craft as a function of time, defined by the route plan transmitted,
comparing by the remote server a trajectory of the boat defined by the route plan of the boat and the at least one trajectory of the at least one other craft,
determining distances separating the positions of the boat and the at least one other craft at regular time intervals according to their respective trajectories and detecting a collision risk if said distance is located below a certain value at a certain moment,
transmitting by the remote server and displaying on the user interface a collision risk indicating a place where said collision will occur.

6. The method for guiding a boat according to claim 4, wherein the method further comprises:
determining by the a space of a port available for mooring said boat in said port,
modifying by the server the route plan transmitted in order to reach the available space, and
transmitting by the server to the central unit the modified route plan to be displayed on the user interface of the boat.

7. The method for guiding a boat according to claim 4, wherein the method further comprises:
- receiving by the boat and at least one other craft a same route plan from different starting points transmitted by the remote server,
- starting from each starting point of the boat and of the at least one other craft to navigate according to the route plan transmitted,
- transmitting by the at least one other craft its position to destination of the remote server,
- transmitting by the remote server the position of the at least one other craft and displaying on the user interface the position of the boat and of the at least one other craft.

8. The method for guiding a boat according to claim 7, wherein the method further comprises calculating by the remote server classifications of the boat and of the at least one other craft depending on their respective positions on the route plan, and displaying on the user interface 7) an indication on the classification of the boat and of the at least one other craft.

9. The method for guiding a boat according to claim 4, wherein the method further comprises introducing a command to signal presence of a floating object in a vicinity of the boat, said introducing triggering a transmitting by the radio device to the remote server a message associating the presence of the floating object at the position of the boat at the time of the introduction of the command.

10. The method for guiding a boat according to claim 4, the at least one tag transmitting a code identifying the of the boat, and wherein the method comprises comparing the code received with a list of identifiers in order to list and display on a screen devices of the boat present and absent on board.

11. The method for guiding a boat according to claim 10, wherein the electronic tag is affixed to a water tank and transmits information representative of the water level inside, the method including comparing a current water level with a minimum water level, and if the level is below the minimum level triggering determination of a new route plan enabling the boat to arrive at a water reserve and displaying said new route plan.

12. The method for guiding a boat according to claim 10, wherein the electronic tag is affixed to a fuel tank and transmits information representative of a fuel level inside the fuel tank, the method including comparing a current fuel level with a minimum fuel level, and if the current level is below the minimum level triggering a determining of a new route plan enabling the boat to arrive at a fuel reserve and a displaying said new route plan.

13. The method for guiding a boat according to claim 10, wherein the at least one electronic tag is affixed to a faulty device of the at least one device, whereof a failure is detectable by said tag, the method including detecting 1) the failure of said faulty device triggering:
- transmitting by the central unit to a ground server a reference of the faulty device,
- searching by the server for a port where a device in working order is available, the port being selected according to its proximity with a point of arrival of the boat,
- transmitting by the server to the boat a new route plan enabling the boat to arrive at the port selected,
- displaying on a screen the new route plan.

14. The method for guiding a boat according to claim 13, further comprising introducing a command to reserve the device present at the port triggering an act of transmitting to the server a signal for reserving said device present at the port.

15. The method for guiding a boat according to claim 4, wherein the boat includes an impact detector configured to detect impacts against a hull of the boat, said method including transmitting to the server a signal when an impact is detected and displaying on a screen of the server of presence of said impact.

\* \* \* \* \*